US008702856B2

(12) United States Patent
Maze et al.

(10) Patent No.: US 8,702,856 B2
(45) Date of Patent: Apr. 22, 2014

(54) BITUMINOUS COATING WITH GREAT ACOUSTIC PERFORMANCE

(75) Inventors: Michel Maze, Bordeaux (FR); Stéphane Faucon-Dumont, Martignas (FR); Sébastien Fer, Saint Médard en Jalles (FR)

(73) Assignee: Eurovia, Rueil Malmaison (FR)

( * ) Notice: Subject to any disclaimer, the term of this patent is extended or adjusted under 35 U.S.C. 154(b) by 335 days.

(21) Appl. No.: 13/122,128

(22) PCT Filed: Oct. 2, 2009

(86) PCT No.: PCT/EP2009/062834
§ 371 (c)(1),
(2), (4) Date: Jun. 14, 2011

(87) PCT Pub. No.: WO2010/037853
PCT Pub. Date: Apr. 8, 2010

(65) Prior Publication Data
US 2011/0232529 A1   Sep. 29, 2011

(30) Foreign Application Priority Data
Oct. 2, 2008   (FR) ...................................... 08 56683

(51) Int. Cl.
*C08L 95/00*   (2006.01)
(52) U.S. Cl.
USPC .................................. 106/281.1; 106/284.01
(58) Field of Classification Search
USPC ................ 106/273.1, 281.1, 284.01
See application file for complete search history.

(56) References Cited

U.S. PATENT DOCUMENTS

| 2,863,841 | A | | 12/1958 | Bernier et al. | |
|---|---|---|---|---|---|
| 3,533,907 | A | * | 10/1970 | Kawam et al. | 162/145 |
| 3,782,988 | A | * | 1/1974 | Alexander et al. | 106/282 |
| 4,168,179 | A | * | 9/1979 | Hesseler | 106/278 |
| 4,332,620 | A | * | 6/1982 | Quinn | 106/281.1 |
| 4,473,404 | A | * | 9/1984 | Eckardt et al. | 106/605 |
| 4,512,806 | A | * | 4/1985 | Graham | 106/277 |
| 4,548,962 | A | * | 10/1985 | Lindmark | 523/220 |
| 5,250,578 | A | * | 10/1993 | Cornwell | 521/83 |
| 5,436,285 | A | * | 7/1995 | Causyn et al. | 524/68 |
| 5,472,498 | A | * | 12/1995 | Stephenson et al. | 106/672 |
| 5,652,284 | A | * | 7/1997 | Eidt et al. | 524/64 |
| 6,043,302 | A | * | 3/2000 | Spendlove | 524/59 |
| 7,384,469 | B2 | * | 6/2008 | Matsuoka et al. | 106/284.01 |
| 2007/0221095 | A1 | * | 9/2007 | Mehta et al. | 106/280 |
| 2010/0075167 | A1 | * | 3/2010 | Gilley et al. | 428/532 |

FOREIGN PATENT DOCUMENTS

| AT | 383 609 | | 7/1987 |
|---|---|---|---|
| DE | 2255624 | * | 5/1974 |
| FR | 2 344 588 | | 10/1977 |
| GB | 2340125 | * | 2/2000 |
| JP | 53/053119 | * | 5/1978 |
| JP | 6-146204 | | 5/1994 |
| JP | 2000-355903 | | 12/2000 |

OTHER PUBLICATIONS

International Search Report issued in application No. PCT/EP2009/062834 on Jan. 28, 2010.

* cited by examiner

*Primary Examiner* — Helene Klemanski
(74) *Attorney, Agent, or Firm* — Foley & Lardner LLP

(57) ABSTRACT

The invention relates to a bituminous coating comprising a material of low bulk density ranging between 0.01 and 0.3 t/m$^3$ in sufficient quantity to improve the acoustic performance thereof.

16 Claims, 3 Drawing Sheets

| Water resistance | Results | | specifications NF EN 13108-2 |
|---|---|---|---|
| Duriez NFP 98-251-1 | R (MPa) R (MPa) r/R | 4.7 3.8 0.82 | >0.8 |
| ITSR NF EN 12697-12 | ITS air (kPa) ITS water (kPa) ITSR | 595 475 80% | >75% |
| Traffic resistance Mechanical stability | Rutting 60°C 3000 cycles | 8.8% | <20% |

Fig. 3

BITUMINOUS COATING WITH GREAT ACOUSTIC PERFORMANCE

The present invention relates to a bituminous coating with improved acoustic performance intended to be integrated within a wearing course or a road surfacing.

The invention is thus in the technical field of public works and more particularly in the field of road construction.

A bituminous coating is a mixture of aggregates (loose chippings, materials from recycling, sand and filler) and a binder of bituminous origin, synthetic or plant derived, with additives or not. Typically and in a non restrictive manner, the sufficient quantity of binder, to obtain 1 to 15 parts by weight of residual bitumen, is mixed with 85 to 99 parts by weight of aggregate (considering their dry weight). There exists, as a function of the composition and particularly that of the granular skeleton, continuous or discontinuous coatings, thick, thin, very thin or even ultra-thin, open (or instead draining or porous), grainy, semi-grainy, dense or semi-dense, storable or not, etc. well known to those skilled in the art, generally normalised and described for example in the 2 volume work "*Les enrobes bitumineux*", edited jointly by the French Road Industry Association (USIRF) and the *Revue Generale des Routes and Aerodromes* (Paris, 2001). Additives may be added either to the binder, or to the aggregate, or to the coating. Additive is taken to mean products of polymer type, waxes of plant or petrochemical origin, adhesion doping agents. These coatings may be used hot (130° C. to 180° C.), warm (110° C. to 130° C.), semi-warm (80° C. to 110° C.), or even cold (T<80° C.).

In the case of the method known as "hot mix", the aggregates are heated in devices known as "dryers" in order to dry them, thereby enabling a good adhesion of the bitumen to the aggregate. The bitumen is also heated, to temperatures of the order of 160° C., in order to lower the viscosity thereof and to enable good coating of the aggregates. The coating thus formed is then applied hot (typically at more than 140° C.) onto the roadway then also hot compacted, the initially high temperature guaranteeing its workability. The material then hardens as it cools.

In methods known as "cold mix", the aggregates are not dried, and are mixed as such, in other words with their natural humidity and at ambient temperature. The bitumen then comes in various forms, the most common being that of a bitumen emulsion which thus makes it possible to have a not very viscous product and thus workable at ambient temperature. The emulsion is sometimes slightly heated to temperatures of the order of 50° C. Another means, of still little developed use but growing, consists in foaming the hot bitumen (typically 160° C.) in contact with a little water injected directly into the bitumen according to suitable methods, and then mixing this foam with humid aggregates. Additives may be added to the bitumen and/or to the injected water to modify the properties of the foam, particularly its stability and its volume.

Methods known as "warm" or "semi-warm", and the name of which is sometimes different to that proposed here (semi-hot, etc.) but which those skilled in the art will know how to recognise in a non equivocal manner, consist either in slightly heating the aggregate, but not enough to dry it completely, or in drying it at temperatures just above 100° C. Several methods exist, the binder also being able to be added in the same forms as for cold bituminous mixes (bitumen emulsion or foam). Also, and in particular when the objective is to reduce the temperature of manufacture and use of hot bituminous mixes, in order to limit the emission of smoke, it can necessitate the use of additives or original methods in order to ensure that the coating maintains a level of workability compatible with its use at temperatures below those normally used.

Aggregate is taken to mean materials of various origins, among which aggregates from quarries or gravel pits, products from recycling such as aggregates derived from the milling of old coatings, manufacturing rejects, materials coming from the recycling of building materials (demolition concrete, etc.), slags, schists, artificial aggregates of any origin and deriving for example from clinker from household waste incineration (CHWI), as well as mixtures thereof in all proportions. These aggregates can be dry or humid. The particle size of the aggregates is chosen in the range $0/D_{max}$, $D_{max}$ being the maximum diameter of the aggregate as defined according to the XP P 18-540 standard and ranging in general from 4 to 31.5 mm.

Aggregates of small dimension, i.e. from 0 to 4 mm, are called sand.

Mineral fines or "filler" are taken to mean any mineral or siliceous filler, having a dimension less than 80 um, advantageously passing through a square mesh sieve with 0.063 mm sides. The fines may be natural fines or added fines, for example limestone fines (calcium carbonate), cement or hydrated lime, or recovered.

Binder is taken to mean a hydrocarbon binder, advantageously of fossil origin, or any binder of plant or synthetic origin that may be used for forming coating, asphalt, mastic, membrane. Advantageously, it is a pure bitumen, of any composition containing bitumen and if appropriate one or more additives and/or one or more emulsifiers and/or one or more viscosifiers and/or one or more fluxes and/or one or more plastifiers and/or any other additive making it possible to adjust the properties thereof, such as for example the adhesivity. By way of example, bitumens, bitumens modified with elastomers and plastomers, bitumen emulsions and bitumen foam may be cited.

This bituminous binder may be in liquid form or in the form of an emulsion or a foam. Advantageously, in the case of the manufacture of cold mix bituminous coatings, the bituminous binder is in the form of an emulsion or a foam.

Additive is taken to mean any product added to the binder and/or the final product, coating, asphalts, mastics, membranes.

These additives are employed for mechanical purposes, copolymer of ethylene (such as EVA, EBA, polyethylene, polypropylene), SBS, SB cross-linked or not, polymers in general.

For adhesion purposes, adhesivity doping agents, for example emulsifiers derived from polyamines, are used.

Within the context of lowering the manufacturing and use temperatures, the additives employed are for example natural oils chemically treated or not, zeolites, paraffin.

Additives can also be used for aesthetic purposes, change of colour of the final products, by the use of pigment, natural or not, such as iron oxide for example.

The circulation of vehicles on a roadway leads to sound nuisances. These nuisances, generally designated tyre road noise or TRN, may be important depending on the position of the roadways in relation to inhabited areas, urban or out of town roads for example, as a function of the flow, the composition and the speed of the traffic, expressway or heavy goods roads for example.

There exists a need for reduction of the sound nuisances attributable to the circulation of vehicles on the wearing course of roadways. This reduction may be obtained by an action on the production of noise at the wheel/roadway contact level and/or by the use of a surfacing having a high noise absorption capacity.

The capacity of a wearing course to reduce the sound nuisances brought about by the tyre road noise (TRN) of vehicles is a parameter that depends, among other things, on the nature of the wearing course, traffic conditions, meteorological conditions and which diminishes over time following the evolution of the nature of the wearing course under the effect of traffic and/or climatic cycles.

Studies on tyre road noise (TRN) have shown that this depends to a large extent on the texture of the roadway and the acoustic absorption capacity of the wearing course.

Certain authors ("*Les enrobes bitumineux*", volume 1, USIRF, 2003 summary report of the OFROU on low noise road surfaces, article of the LCPC congress INFRA 2001 on noise limiting road surfaces) have shown that the important criteria of the wearing course to increase its acoustic absorption capacities are the particle size and the void content.

Particle size is taken to mean the maximum size of the aggregates used in the bituminous coating. An optimal particle size for the reduction of TRN is between 4 and 6 mm.

Void content is taken to mean the volumetric percentage of voids between the coating elements. An optimal void content for the reduction of the TRN ranges between 18 and 25%.

These parameters are targeted by almost all of the existing techniques.

The present invention is based on these parameters, but the inventors have observed that the acoustic absorption is further enhanced by the addition of low density material, advantageously exfoliated vermiculite or expanded perlite.

The objective is to form a wearing course reducing the noise nuisances brought about by tyre road noise (TRN) and which is resistant to road traffic and climatic variations.

The above aims are reached according to the invention by a bituminous coating comprising a sufficient quantity of exfoliated vermiculite to improve its acoustic properties. The bituminous coating according to the invention makes it possible to form a wearing course that has a large noise nuisance reduction capacity.

In a surprising manner, the inventors have in fact observed that the addition of exfoliated vermiculite (0.6% by weight) to a 0/6 mm draining type coating base makes it possible to attain a frequency of absorption of the vibration of 90 Hz (in the impact stress and frequency analysis test used by the research centre—cf. example 3), i.e. a LAmax measurement ranging between 69 dB(A) and 70 dB(A) (see FIG. 2), i.e. a gain ranging between 2 and 3 dB(A) vis-à-vis conventional acoustic coatings.

Moreover, the inventors have shown that this bituminous concrete has traffic resistance complying with the standard relative to this type of coating, i.e. 8.8% of rutting after 3000 cycles for a specification <20%.

The object of the present invention is thus a bituminous coating comprising a mineral and/or organic material of low bulk density ranging between 0.01 and 0.3 t/m³ in sufficient quantity to improve its acoustic performance.

Advantageously, the material of low density ranging between 0.01 and 0.3 t/m³ is an expanded natural rock not soluble in water, even partially.

Advantageously, the expanded natural rock not soluble in water, even partially, is exfoliated vermiculite.

Expanded perlite is excluded from the scope of the invention because it is partially soluble in water.

Exfoliated vermiculite is available commercially. Vermiculite is derived from a mineral of the family of micas by heat treatment.

Preferably, the expanded natural rock not soluble in water, even partially, has a particle size ranging between 0 and 14 mm.

The organic material of oil or plant origin of low bulk density ranging between 0.01 and 0.3 t/m³ may be preferentially an expanded organic material. Advantageously, it represents a solid expanded foam, for example an expanded Ethylene Propylene Diene Monomer (EPDM) type foam or an expanded polystyrene.

Advantageously, the aggregates according to the invention comprise aggregates of small size. According to a preferred embodiment of the invention, the aggregates of bituminous coating according to the invention have a particle size ranging between 2 and 8 mm, preferably between 4 and 6 mm.

In an advantageous manner, the coating according to the invention comprises from 3 to 12%, preferably from 4 to 7% by weight of binder compared to the weight of aggregates.

As shown in FIG. 1, the mineral and/or organic material of low bulk density ranging between 0.01 and 0.3 t/m³ fills in part the voids of the granular skeleton of the bituminous coating according to the invention.

Advantageously, the quantity of mineral and/or organic material of low bulk density ranging between 0.01 and 0.3 t/m³ makes it possible to fill a volume ranging between 1 and 30% of voids, advantageously 10% of voids.

According to a particular embodiment of the invention, the bituminous coating according to the invention thus has a void content ranging between 10 and 30%, advantageously between 15 and 25%, in a particularly preferred manner between 18 and 20% of its total volume.

Advantageously, the quantity of mineral and/or organic material of low bulk density ranging between 0.01 and 0.3 t/m³ ranges between 0.2 and 5%, preferably 0.5 and 1%, in a particularly preferred manner 0.6 and 0.8% weight/weight compared to the total weight of bituminous coating.

Advantageously, the bituminous coating according to the invention has a void content ranging between 18 and 25%.

Advantageously, the aggregates of the bituminous coating according to the invention are compliant for use in wearing courses according to the standards in force.

Advantageously, the bituminous binder of the coating according to the invention is chosen from road bitumens, pure bitumens, bitumens modified by elastomers or plastomers, bitumens with additives.

Advantageously, the binder of the bituminous coating according to the invention is modified or not by elastomers or plastomers and/or comprises an adhesivity doping agent.

Preferably, the bituminous coating according to the invention is a bituminous concrete, in particular of VTBC type (very thin bituminous concrete) of class 1 or 2 according to the NF EN 13108-2 standard.

According to a preferred embodiment of the invention, the bituminous coating according to the invention comprises:
  between around 70 and around 95% of 4/6 mm aggregates,
  between around 0 and around 30% of 0/2 mm aggregates,
  between around 0 and around 5% of filler,
  between around 4 and around 7% of bitumen,
  between around 0.2 and around 1% of vermiculite.

Preferably, the bituminous coating according to the invention comprises:
  around 82.3% of 4/6 mm aggregates,
  around 9.5% of 0/2 mm aggregates,
  around 2.8% of limestone filler,
  around 4.8% of modified bitumen,
  around 0.6% of exfoliated vermiculite.

According to a preferred embodiment of the invention, the bituminous coating according to the invention comprises:

between around 70 and around 80% of 4/6 mm aggregates,
between around 0 and around 30% of 0/2 mm aggregates,
between around 0 and around 5% of filler,
between around 4 and around 7% of bitumen,
between around 0.2 and around 1% of an organic additive of density <0.3 t/m$^3$.

Preferably, the bituminous coating according to the invention comprises:
around 73.4% of 4/6 mm aggregates,
around 18.8% of 0/2 mm aggregates,
around 2% of limestone filler,
around 5.2% of 35/50 bitumen,
around 0.6% of an organic additive of density <0.3 t/m$^3$.

Another object of the invention relates to the use of a bituminous coating according to the invention for the manufacture of a wearing course with improved acoustic performance.

Another object of the invention relates to a wearing course with improved acoustic performance characterised in that it comprises a bituminous coating according to the invention.

Another object of the invention relates to the use of a mineral and/or organic material of low bulk density ranging between 0.01 and 0.3 t/m$^3$, preferably an expanded natural rock not soluble in water, even partially, in a bituminous coating intended for the preparation of a wearing course.

Of a material of low bulk density ranging between 0.01 and 0.3 t/m$^3$ chosen from and/or an organic material.

Within the scope of the invention, the inventor reserves the possibility of adjusting the content of materials of low density in the cited road products, in order to obtain sufficient acoustic performance.

The present invention will be better understood with reference to the figures and the following examples.

BRIEF DESCRIPTION OF THE DRAWINGS

FIG. 3: table of NF EN 13108-2 specifications

EXAMPLES

Example 1

Formation of a Bituminous Coating According to the Invention Comprising an Expanded Natural Rock not Soluble in Water The composition of the tested coating (F1) is the following:

| | |
|---|---|
| 4/6 mm Moreau chippings | 82.3% |
| 0/2 mm Moreau chippings | 9.5% |
| Filler | 2.8% |
| Modified bitumen | 4.8% |
| Vermiculite SF | 0.6% |
| Void content | 20.4% |

The formula is a 0/6 mm draining type coating, the theoretical density of this formula is 2.234 T/m$^3$, the vermiculite (0.09 T/m$^3$) considerably lightens the coating, the dosage at 0.6%, i.e. 6 kg per tonne of coating, corresponds to a volume of 66 liters per tonne of coating.

Example 2

Formation of a Conventional Bituminous Coating (Comparative Test)

In order to establish a comparison and to confirm the effect of the addition of material of low density (vermiculite), the follow composition (F2) was also tested:

| | |
|---|---|
| 4/6 mm Moreau chippings | 74.2% |
| 0/2 mm Moreau chippings | 19% |
| Filler | 1.9% |
| Modified bitumen | 4.9% |
| Void content | 21% |

This composition corresponds to a conventional acoustic coating.

Example 3

Method of Measuring the Acoustic Gain of a Bituminous Coating According to the Invention The inventors use for the measurement of the acoustic absorption a test based on the impact stress of a test sample of coating and frequential analysis of the wave after passing through the coating. After the impact, a vibratory signal is recovered which links the amplitude of the signal as a function of the vibration frequencies. The range of frequencies scanned extends from 20 to 2000 Hz. The frequency retained to represent the acoustic quality of the surfacing is that corresponding to the first maximum amplitude of the signal. A graph (FIG. 2) shows the relation between this measured frequency and the measured performance at LAmax (NF S 31-119-2) on the worksite. The LAmax is a normalised test, used by French Buildings and Highways, which has a national data base at its disposal.

Figure 1:
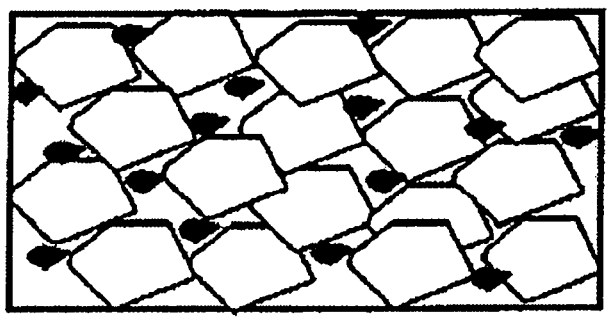
FIG. 1: macrotexture of the bituminous coating according to the invention. (I) coated aggregates. (2) expanded natural rock. (3) voids.
Figure 2:
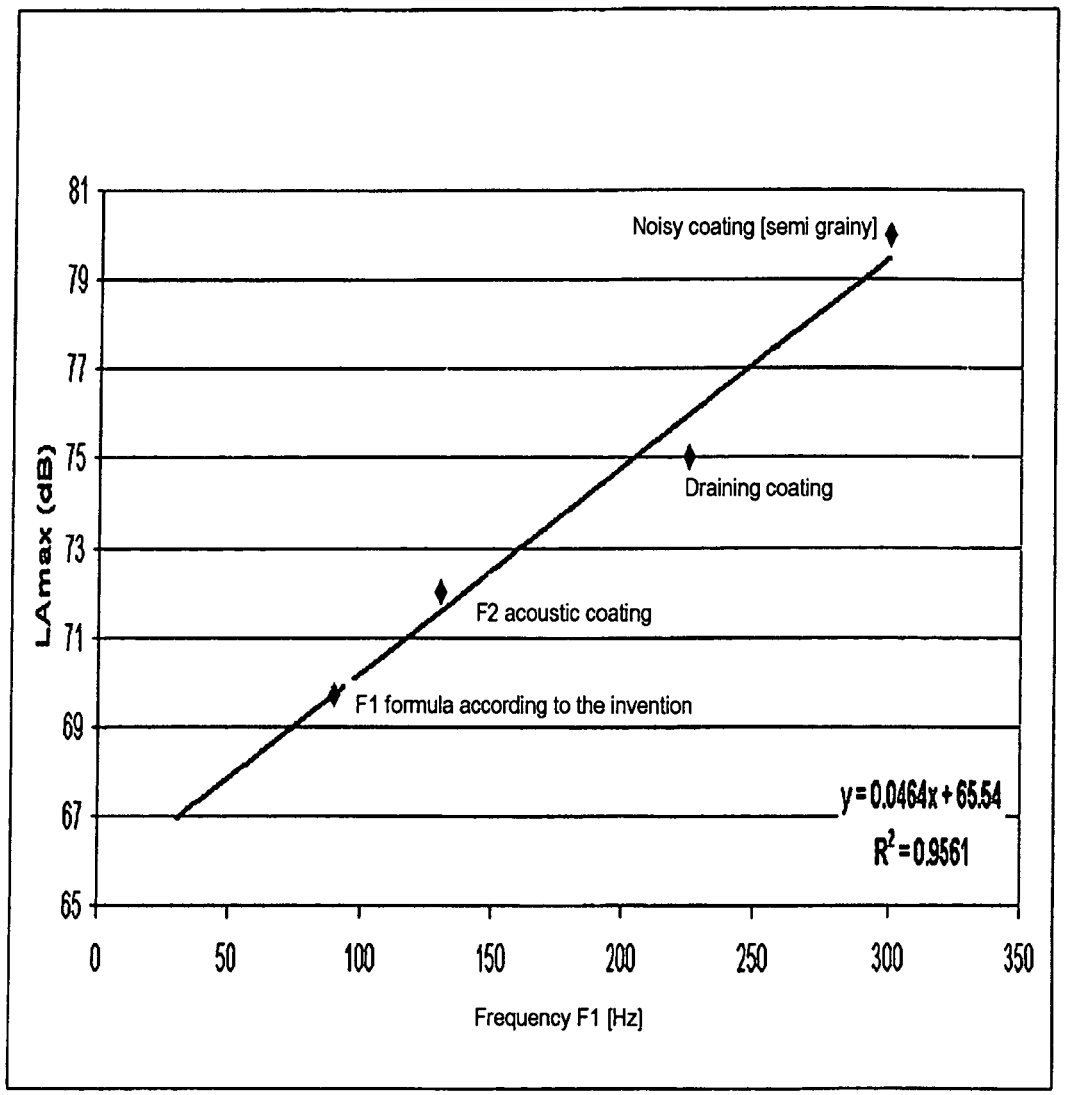
FIG. 2: graph representing the LAmax (NF S 31-119-2) on the worksite as a function of the frequency measured in the test carried out by the research centre.

There exists a classification of coatings established according to the LAmax NF S 31-119-2 tests of December 2000. This normalised method consists in an acoustic measurement on the passage of a controlled vehicle CM. The standard imposes all sorts of parameters: type of vehicle, speed. FIG. 2 shows the LAmax marking of three types of coatings. The LAmax result is expressed in dB(A) (acoustic dB). For information, the threshold at which roadside residents are bothered is 65 dB(A).

Example 4

Test of the Acoustic Gain of a Bituminous Coating According to the Invention

The frequency measured with the formula of Example 1 is 90 Hz, which makes it possible to obtain an LAmax measurement ranging between 69 dB(A) and 70 dB (A) (see FIG. 2)), i.e. a gain ranging between 2 and 3 dB(A) vis-à-vis the formula of Example 2.

The traffic resistance measured at the CRM of the coating developed according to the invention meets the specifications of the NF EN 13108-2 standard relative to very thin layers (VTL)), with regard to all of the conventional mechanical tests (see table FIG. 3).

Example 5

Formation of a Bituminous Coating According to the Invention Comprising an Organic Material The coating composition tested (F3) is the following:

| | |
|---|---|
| 4/6 mm Moreau chippings | 73.4% |
| 0/2 mm Moreau chippings | 18.8% |
| Filler | 2% |
| Bitumen 35/50 | 5.2% |
| Organic additive d < 0.3 t/m³ | 0.6% |

As studied according to examples 3 and 4, the frequency measured in the acoustic absorption test is 82 Hz, which leads, according to FIG. 2, to a LAmax measurement of 69 dB(A), i.e. −3 dB(A) vis-à-vis the reference composition, example 2.

Example 5

Mechanical Performance of the Composition F3

| Tests | Results | Specifications |
|---|---|---|
| Duriez NF EN 12697-12 | | |
| $C_D$ (kPa) | 7236 | |
| $C_W$ (kPa) | 5634 | |
| i/C (%) | 78% | >75% |
| Rutting NF EN 12697-22 | | |
| % rutting 3000 cycles | 5.1% | <20% |
| % test sample voids | 18.2 | 16-22% |

BIBLIOGRAPHIC REFERENCES

*Les enrobes bitumineux*, Volumes 1 and 2: USIRF
*Rapport de synthèse* 2003 of the OFROU
Article LCPC congress INFRA 2001
*Guide technique de dimensionnement de chaussee* of the SETRA
*Gel/dégel*: http://www.aqtr.qc.ca/documents/11 AllocutionsConferences/Pierre_Langlois.pdf
*La route ça m'interesse: Revue generale des route*
*Gel/dégel*: http://infos-routes.cg03.fr/img/schema.gif
*Manuel LCPC d'aide a la formulation des enrobes*. J-L Delorme, C. de la Roche, L. Wendling

The invention claimed is:

1. Bituminous coating comprising bituminous binder and aggregates, the coating comprises from 3 to 12% by weight of said binder compared to the weight of said aggregates, further comprising a material of low bulk density ranging between 0.01 and 0.3 t/m³ selected from the group consisting of exfoliated vermiculite, expanded ethylene propylene diene monomer, expanded polystyrene, and combinations thereof, in sufficient quantity to improve the acoustic performance thereof, said bituminous coating has a void content ranging from 10 and 30%.

2. Bituminous coating according to claim 1, wherein the quantity of material of low bulk density ranges between 0.2 and 5% compared to the total weight of bituminous coating.

3. Bituminous coating according to claim 1, wherein the quantity of material of low bulk density has a particle size ranging between 0 and 14 mm.

4. Bituminous coating according to claim 1, comprising:
about 82.3% of 4/6 mm aggregates,
about 9.5% of 0/2 mm aggregates,
about 2.8% of limestone filler,
about 4.8% of modified bitumen,
about 0.6% of exfoliated vermiculite.

5. Bituminous coating according to claim 1, comprising:
about 73.4% of 4/6 mm aggregates,
about 18.8% of 0/2 mm aggregates,
about 2% of limestone filler,
about 5.2% of 35/50 bitumen,
about 0.6% of an organic additive of density <0.3 t/m³.

6. Method of making of a wearing course, comprising mixing bituminous binder and aggregates, from 3 to 12% by weight of binder compared to the weight of aggregates, and further a material of low bulk density ranging between 0.01 and 0.3 t/m³ selected from the group consisting of exfoliated vermiculite, expanded ethylene propylene diene monomer, expanded polystyrene, and combinations thereof, to form a bituminous coating suitable for the manufacture of a wearing course with improved acoustic performance.

7. Wearing course with improved acoustic performance comprising a bituminous coating according to claim 1.

8. A method of road surfacing, comprising applying a wearing course to a roadway, wherein the wearing course comprises bituminous binder and aggregates, from 3 to 12% by weight of binder compared to the weight of aggregates, and further a material of low bulk density ranging between 0.01 and 0.3 t/m³ selected from the group consisting of exfoliated vermiculite, expanded ethylene propylene diene monomer, expanded polystyrene, and combinations thereof, in sufficient quantity to improve the acoustic performance of the roadway.

9. Bituminous coating according to claim 2, wherein the quantity of material of low bulk density ranges between 0.5 and 1% compared to the total weight of bituminous coating.

10. Bituminous coating according to claim 9, wherein the quantity of material of low bulk density ranges between 0.6 and 0.8% compared to the total weight of bituminous coating.

11. Bituminous coating according to claim 1, wherein the bituminous coating has a void content ranging from 15 and 25%.

12. A method for improving the acoustic performance of a bituminous coating, comprising the step of adding to a bituminous binder and aggregates, in mass content of from 3 to 12% by weight of said binder compared to the weight of said aggregates, a material of low bulk density ranging between 0.01 and 0.3 t/m³, said material is selected from the group consisting of expanded natural rock not soluble in water, even partially, expanded ethylene propylene diene monomer, expanded polystyrene, and combinations thereof, to form the bituminous coating having a void content ranging from 10 and 30%.

13. The method of claim 12, wherein the bituminous coating has a void content ranging from 15 and 25%.

14. The method of claim 12, wherein a quantity of material of low bulk density ranges between 0.2 and 5%, compared to the total weight of bituminous coating.

15. The method of claim 14, wherein the quantity of material of low bulk density ranges between 0.5 and 1%, compared to the total weight of bituminous coating.

16. The method of claim 12, wherein the material of low bulk density has a particle size ranging between 0 and 14 mm.

\* \* \* \* \*